United States Patent

Joensuu et al.

[11] Patent Number: 5,839,065
[45] Date of Patent: Nov. 17, 1998

[54] VALIDATION OF A FORWARD-TO-NUMBER BY A MOBILE STATION

[75] Inventors: Erkki Joensuu; Eric Valentine, both of Plano; David Boltz, Garland; Ranjit Bhatia, Dallas; James L. Mills, Plano, all of Tex.

[73] Assignee: Ericsson Inc., Research Triangle Park, N.C.

[21] Appl. No.: 636,288

[22] Filed: Apr. 23, 1996

[51] Int. Cl.⁶ ....................................................... H04Q 7/20
[52] U.S. Cl. ........................ 455/414; 455/417; 455/517; 379/211
[58] Field of Search .................................. 455/414–417, 455/432, 433, 445, 517; 379/210–212

[56] References Cited

U.S. PATENT DOCUMENTS

| | | | |
|---|---|---|---|
| 3,854,013 | 12/1974 | Altenburger et al. | 379/211 |
| 4,768,221 | 8/1988 | Green et al. | 379/211 |
| 4,807,279 | 2/1989 | McClure et al. | 379/211 |
| 4,833,701 | 5/1989 | Comroe et al. | 455/432 |
| 4,893,336 | 1/1990 | Wuthnow | 379/211 |
| 5,142,654 | 8/1992 | Sonberg et al. | 379/59 |
| 5,289,528 | 2/1994 | Ueno et al. | 379/67 |
| 5,329,578 | 7/1994 | Breenan et al. | 379/67 |
| 5,335,278 | 8/1994 | Matchett et al. | 380/23 |
| 5,408,528 | 4/1995 | Carlson et al. | 379/211 |
| 5,440,614 | 8/1995 | Sonberg et al. | 379/60 |
| 5,448,627 | 9/1995 | Ueno et al. | 379/67 |
| 5,448,631 | 9/1995 | Cain | 379/201 |
| 5,473,671 | 12/1995 | Partridge, III | 379/59 |
| 5,577,103 | 11/1996 | Foti | 455/414 |

FOREIGN PATENT DOCUMENTS

| | | |
|---|---|---|
| 0255325 | 2/1988 | European Pat. Off. . |
| 0531048 | 3/1993 | European Pat. Off. . |
| 3843870 | 6/1990 | Germany . |

Primary Examiner—Dwayne D. Bost
Assistant Examiner—Nay Maung
Attorney, Agent, or Firm—Jenkens & Gilchrist, P.C.

[57] ABSTRACT

A call forwarding activation request is transmitted from a mobile station to the serving mobile switching center (MSC) over a data channel incapable of carrying voice data. However, mobile subscribers and mobile service providers would like to establish a speech connection between the mobile station and the forward-to-number to ensure that the forward-to-number has been dialed correctly and that desired parties are at the other end. Accordingly, whenever a call forwarding activation request is received by the mobile station, the mobile station itself initiates an outgoing call setup toward the forward-to-number. The connectionless signal encapsulating the activation request is transmitted to the serving MSC only after the successful completion of such call setup. After receiving the transmitted connectionless signal, the serving HLR alters the call forwarding feature status to active.

20 Claims, 4 Drawing Sheets

5,839,065

VALIDATION OF A FORWARD-TO-NUMBER BY A MOBILE STATION

CROSS REFERENCE TO RELATED APPLICATION

This application is related to U.S. application for patent Ser. No. 08/637,939, filed Jun. 24, 1996, entitled "Validation Of A Forward-To-Number Within A Mobile Telecommunications System" (Docket No. 27943/43).

BACKGROUND OF THE INVENTION

1. Technical Field of the Invention

The present invention relates to mobile telecommunications systems and, in particular, to the validation of a forward-to-number for call forwarding subscriber features.

2. Description of Related Art

In a typical mobile or wireline telecommunications system, a subscriber activates his call forwarding features by first establishing a speech connection with the telecommunications network serving the subscriber and then by manually inputting a desired forward-to-number. For example, the subscriber dials service code *76 for the Call Forwarding Don't Answer (CFDA) feature followed by a specific forward-to-number to activate the CFDA feature. Even though the subscriber might already know the validity of the forward-to-number, it is prudent to physically establish a speech connection with the entered forward-to-number to confirm that all future calls will indeed be forwarded to the correct number and that desired parties will be available to answer the forwarded calls. Accordingly, after receiving the entered forward-to-number, the telecommunications network initiates an outgoing call toward the forward-to-number to physically establish a speech connection between the mobile subscriber and the telephone terminal associated with that particular forward-to-number (this action will hereinafter be referred to as the validation call). By means of the validation call, the system ensures that the forward-to-number is a valid and correct directory number within the telecommunications network. If the subscriber has inadvertently dialed a wrong number, or an unwanted user has answered the validation call, the subscriber is alerted and can abort the activation process. If the mobile subscriber confirms the validation call, all incoming calls terminating to the mobile station are subsequently forwarded to the forward-to-number.

In the Global System for Mobile (GSM) or GSM based Personal Communications System (PCS) environment, a speech connection with the serving mobile switching center (MSC) is not utilized to activate or deactivate special subscriber features. With the development of data channels or control channels separate from the voice channels, mobile stations can communicate data with a Public Land Mobile Network (PLMN) without utilizing a speech connection. As an illustration, a PCS environment mobile station displays a menu enumerating the available feature options to a mobile subscriber. The mobile subscriber selects a desired feature option, such as the activation of a call forwarding feature, and enters the subsequently needed forward-to-number. A Direct Transfer Application Protocol (DTAP) based message, such as a Radio Interface Layer Three - Call Control (RIL3CC) message, encapsulating the activation request along with the forward-to-number is transported to the serving PLMN over a connection-less communications link such as a Fast Associated Control Channel (FACCH). The serving Mobile Switching Center (MSC) receives the DTAP message, extracts the encapsulated activation request and the forward-to-number, and alters the state of the call forwarding feature to reroute all future incoming calls intended for that particular mobile station to the designated forward-to-number.

However, because there is no speech connection between a mobile station and the serving MSC, and the data channel is incapable of transporting voice data, the mobile telecommunications network is unable to establish a validation call between the subscriber and the entered forward-to-number. There is accordingly a need for a method and system to validate a forward-to-number associated with an activated call forwarding feature within the PCS or GSM environment.

SUMMARY OF THE INVENTION

The present invention provides a method and apparatus for verifying the validity of a forward-to-number and for activating a call forwarding feature towards the verified forward-to-number from a mobile station. A mobile station receives a request to activate a call forwarding feature from a mobile subscriber towards a particular forward-to-number. The mobile station initiates an outgoing call setup towards the telephone terminal associated with the particular forward-to-number to verbally verify the number. Upon successful completion of the speech connection between the mobile station and the telephone terminal, the mobile station transmits a request message over a connection-less data channel to the HLR via the serving mobile switching center (MSC) to activate the call forwarding feature.

The request message may comprise a Direct Transfer Application Protocol (DTAP) based message encapsulating a call forwarding request along with the desired forward-to-number. The connection-less data channel may comprise a Fast Associated Control Channel (FACCH). In an alternative embodiment, the subscriber may choose to override the validation call procedure.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
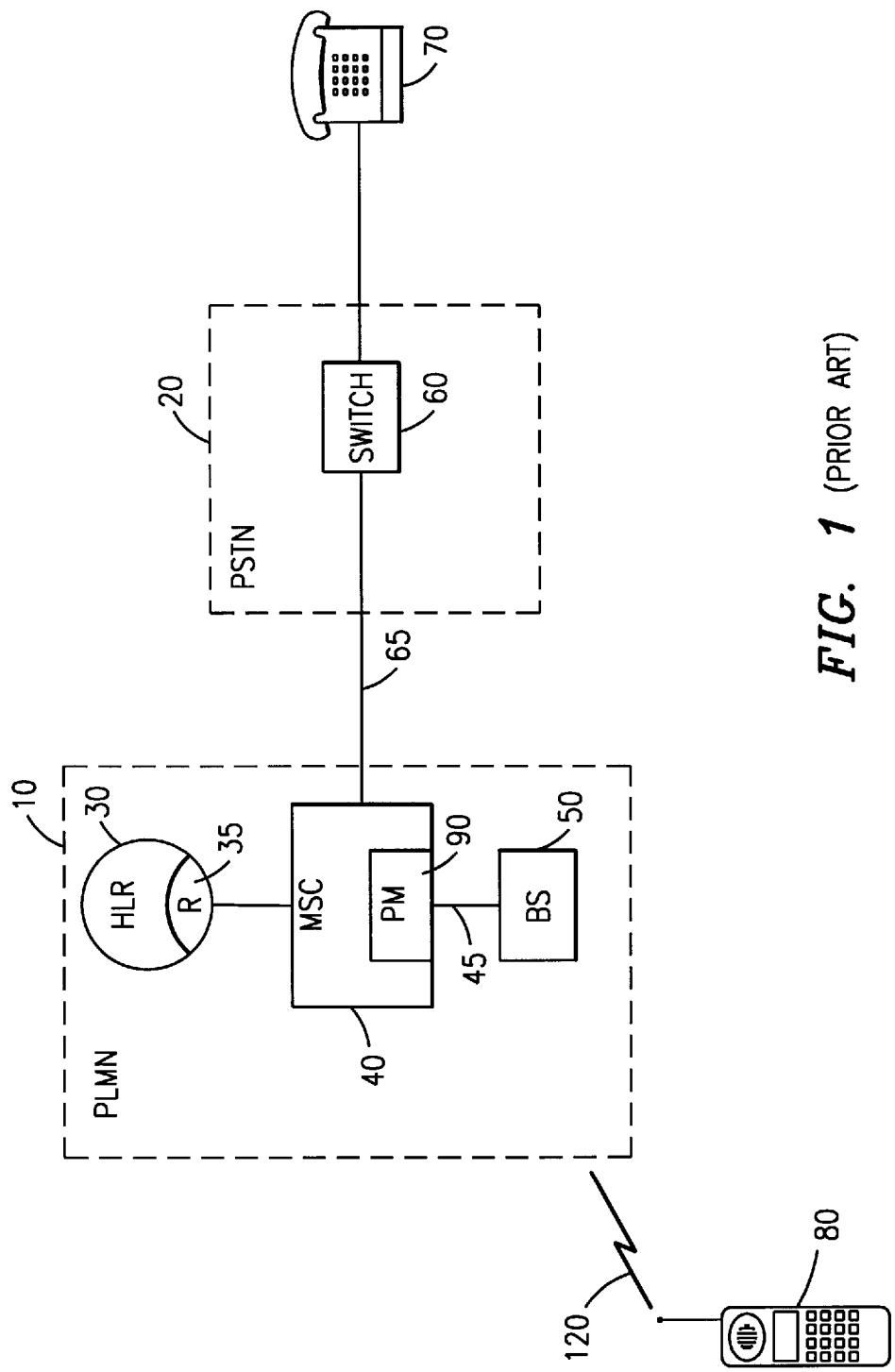
FIG. 1 is a block diagram of a Public Land Mobile Network (PLMN) illustrating the activation of a call forwarding feature in accordance with the prior art.

FIG. 1 is a block diagram of a conventional Public Land Mobile Network (PLMN) such as an analog cellular telecommunications network. The PLMN 10, which is used to communicate with a mobile station 80, comprises a Mobile Switching Center (MSC) 40, a home location register (HLR)

30, a visiting location register (VLR, not shown in FIG. 1), and a base station (BS) 50. The BS 50 is connected to the MSC 40 using a digital communications link 45, and communicates with a mobile station 80 via a radio channel 120. The mobile station 80 further communicates with other subscribers, such as a wireline terminal 70, via a Public Switched Telephone Network (PSTN) 20. The HLR 30 is a data base containing information about all "home" subscribers, their services and location. For example, the HLR 30 contains subscriber category information reflecting whether a particular mobile subscriber has a subscription to a particular call forwarding feature, and if the subscriber has the feature activated, the identity of the forward-to-number.

A call from the mobile subscriber starts when the mobile subscriber first keys in the desired destination number or service code and then presses the send button. An access channel is seized, whereupon the mobile identity and the entered number are automatically transmitted to the MSC 40 via the BS 50. The MSC 40 retrieves the subscriber category information for the calling subscriber from the HLR 30 and verifies that the caller has access to the system. The keyed number is also analyzed to determine if the caller is allowed to call that particular number or to invoke a subscriber feature associated with the entered service code. If all analyses are affirmative, the mobile station 80 is assigned to an analog or digital voice channel 120 and the call is set up.

The following steps are taken in accordance with the prior art when the mobile station 80 activates a call forwarding feature such as a Call Forwarding Unconditional (CFU) toward a wire-line terminal 70. A mobile subscriber turns on the mobile station 80 and enters the appropriate CFU service code and the forward-to-number representing the telephone terminal 70. After determining that the mobile station 80 has access to the network, the MSC 40 determines whether the mobile station 80 has a subscription to the CFU subscriber feature. Upon determining that the mobile station 80 has a subscription to the subscriber feature, the CFU program module (PM) 90 is seized. The CFU program module (PM) 90 initiates a speech connection 65 with the wireline terminal 70 by originating an outgoing validation call toward the local exchange 60 serving the wireline terminal 70. After the call set up has been successful, the mobile station 80 hears the ring tone and waits for the wireline terminal 70 to go off-hook. After the wireline terminal 70 goes off-hook and answers the CFU validation call, a speech connection between the mobile station 80 and the wireline terminal 70 is established. A mobile subscriber associated with the mobile station 80 may then verify or confirm with the subscriber associated with the wireline terminal 70 that he is about to forward all future calls to that particular number. After the validation call is disconnected, the CFU program module (PM) 90 alters the state of the CFU subscriber feature for the mobile station 80 by modifying the CFU subscriber information within the HLR 30. Thus, a register (R) 35 within the HLR 30 represents the mobile station's CFU status as active. The register (R) 35 further stores the forward-to-number entered by the mobile subscriber. Subsequently, whenever an incoming call for the mobile terminal 80 is received, the CFU program module (PM) 90 retrieves the stored forward-to-number from the register (R) 35 and reroutes the call to the wireline terminal 70. On the other hand, if the mobile subscriber has misdialed or an unwanted party has answered the validation call, the mobile subscriber is alerted and can abort the call forwarding activation process.

Figure 2:
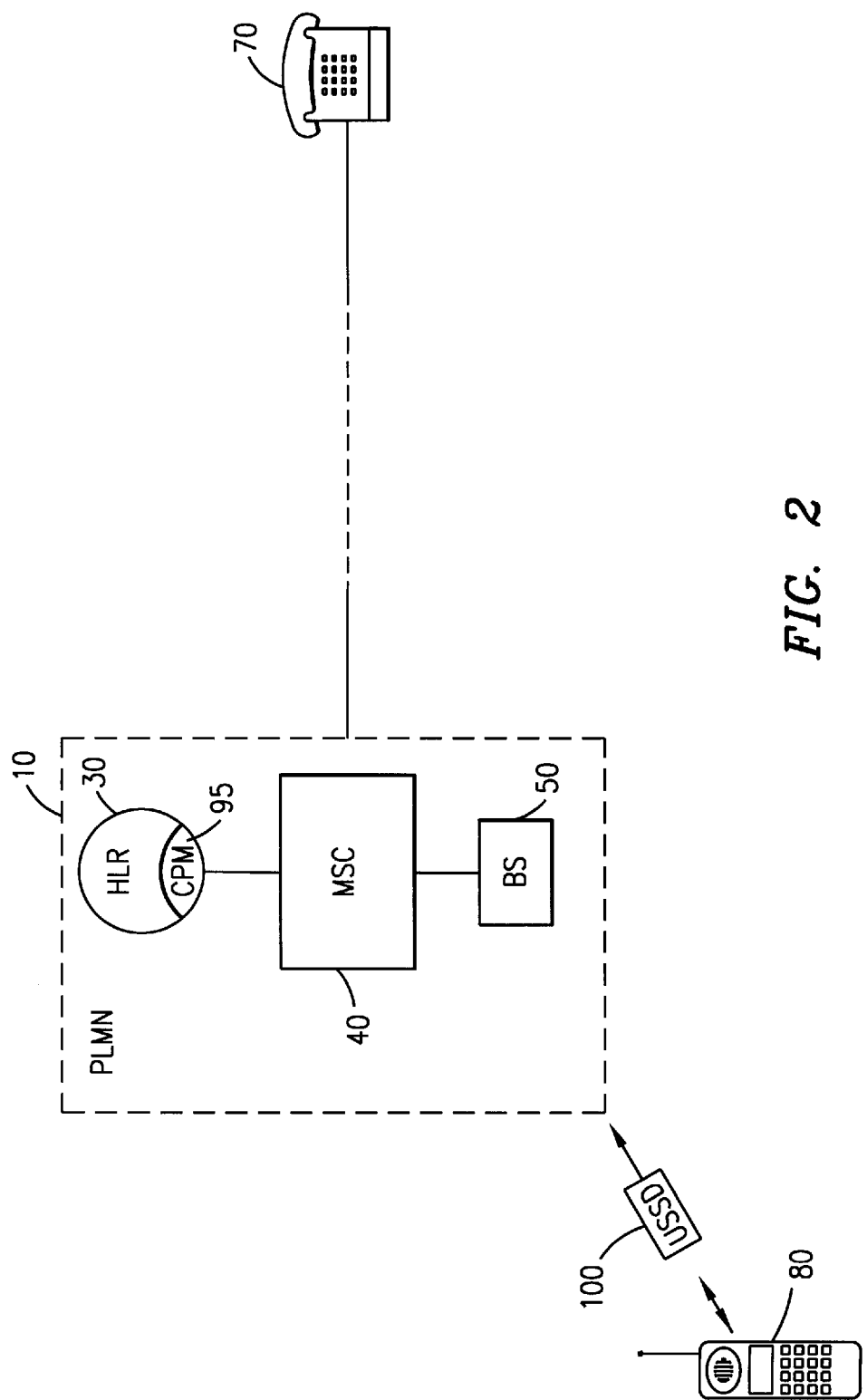
FIG. 2 is a block diagram of a PLMN illustrating the communication of a Direct Transfer Application Protocol (DTAP) based message to activate a call forwarding feature in accordance with the prior art.

Reference is now made to FIG. 2. With the introduction of the Global System for Mobile (GSM) or Personal Communications System (PCS), call forwarding subscriber feature activations are no longer performed over a traffic channel. A Direct Transfer Application Protocol (DTAP) based message 100 transmitted over a Fast Associated Control Channel (FACCH) is utilized within the PCS environment to transport feature data between the mobile station 80 and the serving MSC 40. By utilizing a DTAP based message 100, the mobile station 80 is able to request an activation of a subscriber feature without establishing a speech connection with the serving MSC 40. After receiving the DTAP based message 100 transmitted by the mobile station 80, the BS 50 forwards the message transparently to the MSC 40. The MSC 40 receives the DTAP based message 100 and extracts the encapsulated data for forwarding to the appropriate application module. For example, if the DTAP based message 100 encapsulated a request to activate CFU, the MSC 40 forwards the extracted request to the CFU activation program module (CPM) 95. The CFV activation program module (CPM) 95 retrieves the relevant subscriber information and confirms that the requesting mobile subscriber has a subscription to the CFU feature. The CFU activation program module (CPM) 95 then alters the relevant subscriber information to reflect the activation status of the CFU subscriber feature. Because the activation request was received over a data channel using a connectionless communications link, and not over a traffic channel, there is no speech "leg" between the mobile station 80 and the serving PLMN 10. Accordingly, absent use of a traffic channel, it is not possible to provide verbal verification between the activating mobile subscriber and the entered forward-to-number. It is recognized, however, that in most instances, it is prudent to validate the forward-to-number.

Figure 3:
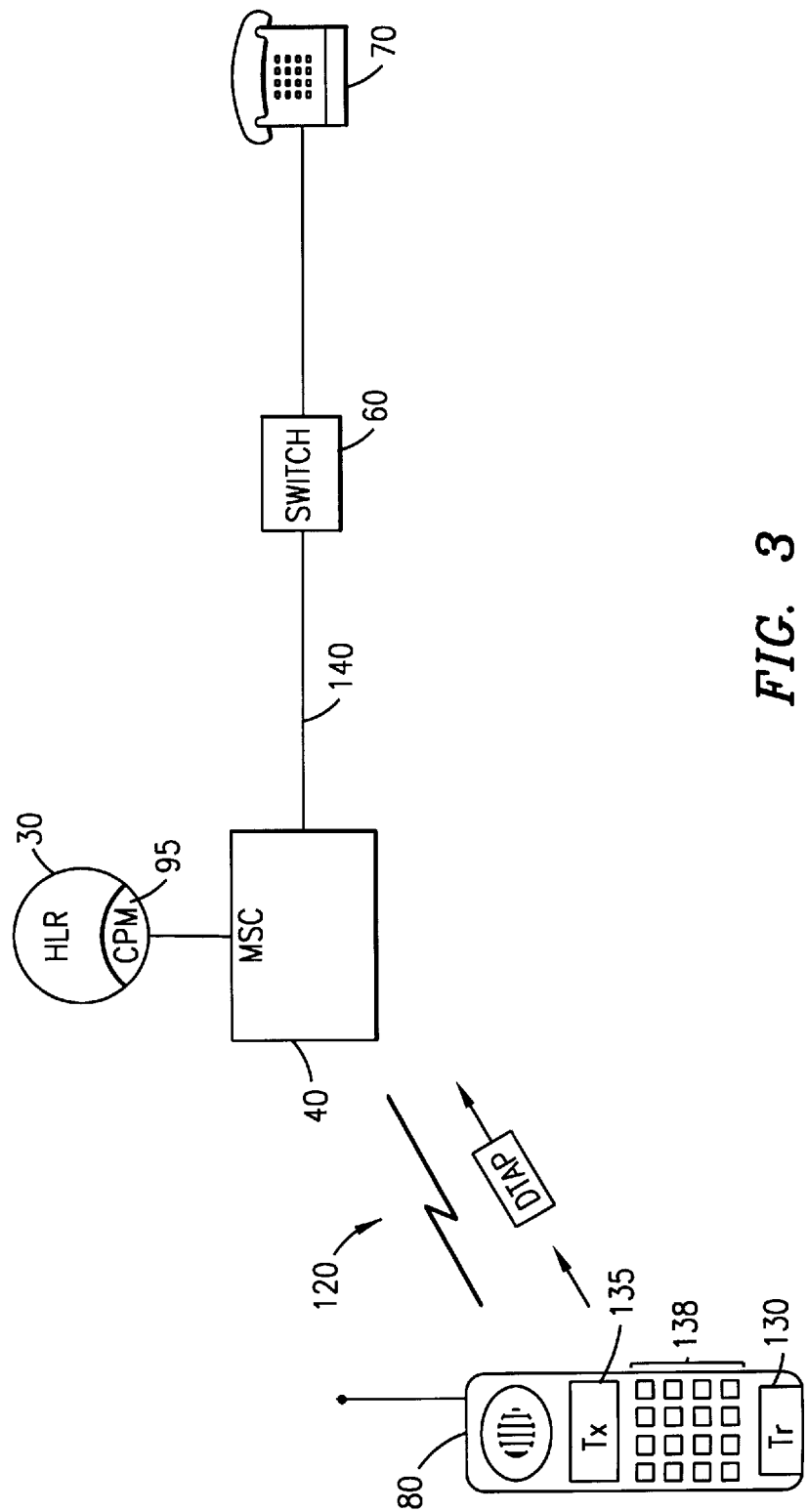
FIG. 3 is a block diagram illustrating a mobile station originating a validation call toward a forward-to-number before transmitting an activation request to the serving mobile switching center (MSC) over a connection-less communications link.

Reference is now made to FIG. 3 wherein there is shown a block diagram illustrating a mobile station 80 originating a validation call to enable a mobile subscriber to verbally verify the forward-to-number within a PCS environment in accordance with the teachings of the present invention. Such a validation call connection is established by the mobile station 80 before a DTAP based message 100 encapsulating an activation request is transmitted to the serving MSC 40. Whenever the mobile subscriber wishes to activate a subscriber feature, the mobile station 80 displays a menu enumerating the available feature options to a mobile subscriber. The mobile subscriber selects the desired feature option, such as the activation of the CFU feature, and enters the subsequently needed forward-to-number by means of a data entry device 138 such as an alphanumeric key pad. Instead of immediately transmitting the activation request over a FACCH using a DTAP based message, the mobile station 80 utilizes a transmitter (Tx) 135 within the mobile station 80 to request an outgoing call connection towards the forward-to-number over a traffic channel (TCH) 120. The MSC 40 receives the request to set up an outgoing call from the mobile station 80 and initiates a call setup as if the mobile station 80 has dialed an outgoing call number. The call is routed over a trunk 140 to the local exchange 60 serving the telephone terminal 70 associated with the forward-to-number. The local exchange 60 performs a number analysis on the received forward-to-number, determines the line status, and accordingly alerts the telephone terminal 70. Upon answering the call, the mobile station 80 is in speech connection with the telephone terminal 70. The mobile subscriber can now verbally verify the forward-to-number.

Once the validation call is disconnected between the mobile station 80 and the telephone terminal 70, a transmitter (Tx) 130 within the mobile station 80 transmits a DTAP based message 100 to the serving MSC 40. As described previously, such an DTAP based message 100 encapsulates the activation request along with the verified forward-to-number and is transmitted over a connection-less communications link such as a Fast Associated Control Channel (FACCH). When the MSC 40 receives the transmitted DTAP based message 100, the validation call has already been established between the two parties and the mobile subscriber has been ensured that the requested forward-to-number is a valid number. Accordingly, without further verification, the MSC 40 transparently forwards the activation request to the CPM 95 within the HLR 30. The CPM 95 retrieves the necessary subscriber information and determines whether the mobile subscriber has a subscription to CFU. In response to an affirmative determination, the CPM 95 updates the CFU feature status as active for the requesting mobile subscriber. The CPM 95 further stores the transmitted forward-to-number with the HLR 30 to cause all future incoming calls to forward properly to the telephone terminal 70.

Figure 4:
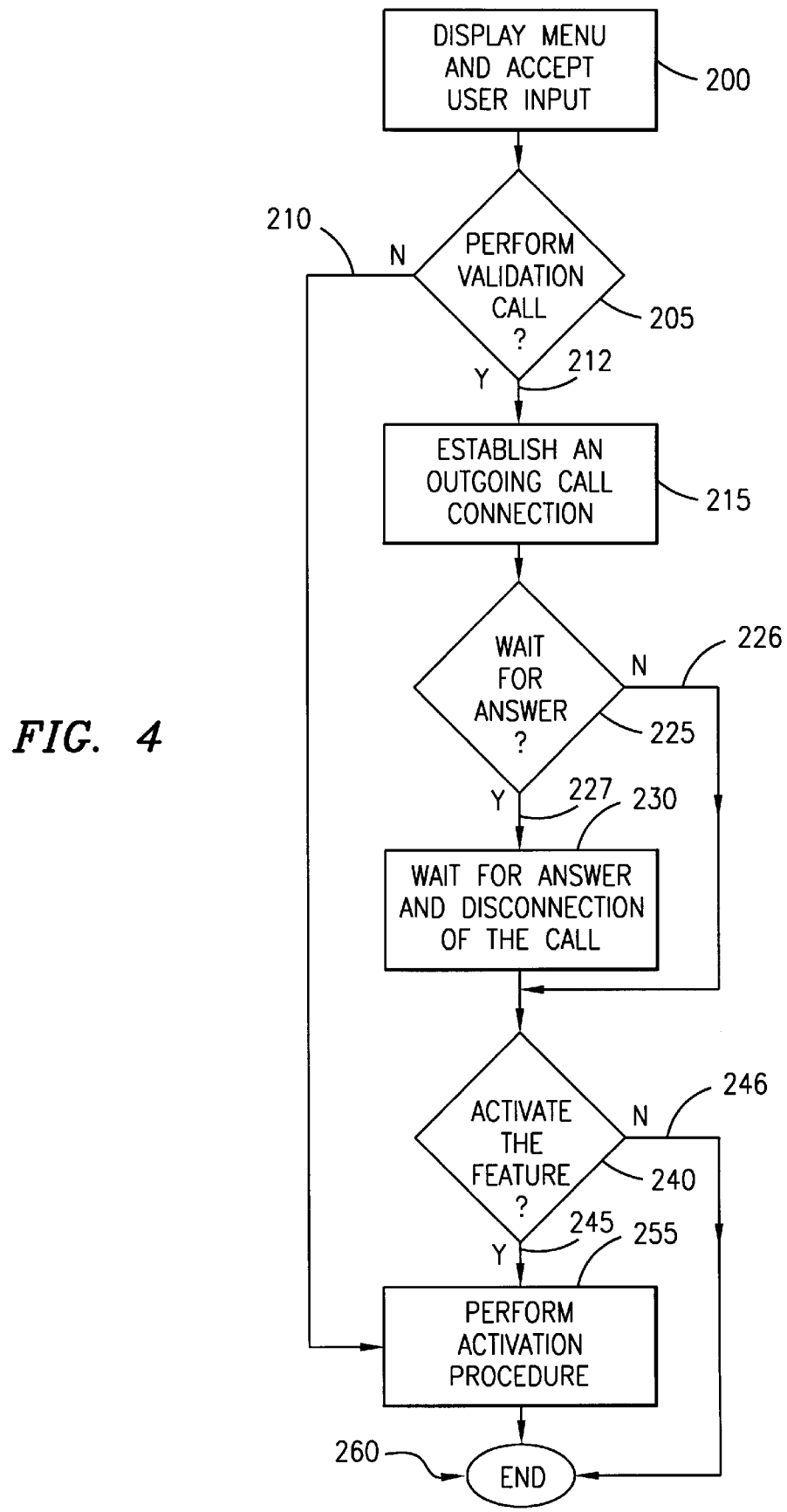
FIG. 4 is a flow chart illustrating the steps performed by a mobile station to verify the validity of a forward-to-number and to activate the requested call forwarding feature in accordance with the teachings of the present invention.

FIG. 4 is a flowchart illustrating the steps performed by a mobile station to verify the validity of a forward-to-number and to activate a call forwarding feature in response to such verification. The mobile station displays a menu enumerating the possible feature options to the mobile subscriber at step 200. The mobile subscriber selects a call forwarding feature to be activated and further enters the desired forward-to-number at this step. The mobile station then asks whether the mobile subscriber wishes to perform a validation call procedure to verbally verify the entered forward-to-number (step 205). If the mobile subscriber does not want to establish a validation call (decision link 210), the mobile station transmits an activation message towards the serving MSC at step 225. On the other hand, if the mobile subscriber chooses the validation call procedure (decision link 212), the mobile station initiates an outgoing call connection towards the forward-to-number at step 215. The request to originate a call is received by the MSC over a traffic channel and a voice connection is subsequently established between the mobile station and the forward-to-number. The mobile station then asks the mobile subscriber whether the call forwarding activation should be performed after the validation call is answered (step 225). This is to enable the mobile subscriber to verbally verify the party at the other end before the feature is activated. If the mobile subscriber wishes to activate the feature only after the validation call has been answered (decision link 227), the mobile station awaits for the call answer and disconnection at step 230. Otherwise, the decision link 226 is taken and the activation procedure is resumed without waiting for the validation call to be answered.

The mobile station lastly requests final confirmation from the mobile subscriber before activating the call forwarding feature to the forward-to-number at step 240.

If the mobile subscriber has inadvertently dialed a wrong number or an undesired party has answered the validation call, this final confirmation enables the mobile subscriber to abort the activation process (decision link 246). Otherwise, the decision link 245 is taken and a DTAP based message encapsulating an activation request along with the specified forward-to-number is transmitted over a FACCH toward the serving MSC at step 255. After receiving the DTAP based message, the MSC encapsulates the activation request into a MAP signal and forwards it to the HLR for altering the call forwarding feature activation status (step 260).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for activating a call forwarding feature from a mobile station, said mobile station served by a mobile switching center (MSC) within a mobile telecommunications system, said method comprising the steps of:

receiving a subscriber activation request and a particular forward-to-number for said call forwarding feature;

querying by the mobile station of a user on whether a verbal verification of Said forward-to-number should be made;

establishing, responsive to an affirmative indication by said user during said querying step, a speech connection with a telephone terminal associated with said particular forward-to-number to verbally verify said forward-to-number; and transmitting a connection-less signal encapsulating said activation request and said particular forward-to-number to said MSC in response to successful establishment of said speech connection.

2. The method of claim 1 wherein said step of transmitting further comprises the step of transmitting a Direct Transfer Application Protocol (DTAP) based message encapsulating said activation request and said particular forward-to-number.

3. The method of claim 1 further comprising the step of receiving a first user input indicating whether said step of establishing said speech connection should be performed.

4. The method of claim 1 wherein said step of transmitting further comprises the step of transmitting said connection-less signal after said speech connection has been answered and terminated.

5. A system for activating a call forwarding feature from a mobile station, said mobile station served by a mobile switching center (MSC) within a mobile telecommunications system, said system comprising:

means for receiving an activation request and a particular forward-to-number for said call forwarding feature;

means for querying by the mobile station of a user on whether a verbal verification of said forward-to-number should be made;

means, responsive to receipt of an affirmative indication from said user by said means for querying, for establishing a speech connection with a telephone terminal associated with said particular forward-to-number to verbally verify said forward-to-number; and means for transmitting a connection-less signal encapsulating said activation request and said particular forward-to-number to said MSC in response to successful establishment of said speech connection.

6. The system of claim 5 wherein said means for transmitting further comprises means for transmitting a Direct Transfer Application Protocol (DTAP) based message encapsulating said activation request and said particular forward-to-number.

7. The system of claim 5 further comprising means for receiving a first user input indicating whether said means for establishing said speech connection should be invoked.

8. The system of claim 5 wherein said means for transmitting further comprises means for transmitting said connection-less signal after said speech connection has been answered and terminated.

9. A mobile station for activating a call forwarding feature toward a particular forward-to-number, said mobile station served by a particular Mobile Switching Center (MSC) within a mobile telecommunications network, said mobile station comprising:

a receiver for receiving a subscribes activation request and said forward-to-number from a mobile subscriber associated with said mobile station;

means for generating an outgoing call setup towards said forward-to-number over a traffic channel (TCH) to verbally verify said forward-to-number;

means, responsive to successful generation of an outgoing all setup by said means for generating, for querying by the mobile station of a user on whether to complete activation of said call forwarding feature; and a transmitter for transmitting a connection-less signal over a data channel to request said MSC to activate said call forwarding feature in response to receipt of an affirmative indication by said means for querying.

10. The mobile station of claim 9 wherein said connection-less signal comprises a Direct Transfer Application Protocol (DTAP) based message.

11. The mobile station of claim 9 wherein said receiver further comprises means for receiving a user input indicating whether said outgoing call setup should be performed.

12. The mobile station of claim 9 wherein said receiver further comprises means for receiving a user input indicating whether said connection-less signal should be transmitted after said outgoing call setup has been answered and disconnected.

13. A method for verifying and activating a forward-to-number for a call forwarding feature from a mobile station, said mobile station served by a Mobile Switching Center (MSC), said method comprising the steps of:

receiving a request to activate said call forwarding feature towards said forward-to-number;

originating an outgoing call setup towards said forward-to-number over a traffic channel (TCH);

if said outgoing call setup is successful, querying by the mobile station of a user on whether to complete activation of said call forwarding feature; and if an affirmative indication is received during said querying step, transmitting a connection-less signal over a data channel to said MSC to activate said call forwarding feature towards said forward-to-number.

14. The method of claim 13 wherein said step of transmitting further comprises the step of transmitting a Direct Transfer Application Protocol (DTAP) based message encapsulating said request and said forward-to-number.

15. The method of claim 13 wherein said step of receiving said request further comprises the step of receiving a user input indicating whether said outgoing call setup should be performed.

16. The method of claim 13 wherein said step of transmitting further comprises the step of transmitting said connection-less signal after said outgoing call setup has been answered and disconnected.

17. A system for verifying and activating a forward-to-number for a call forwarding feature within a mobile station, said mobile station served by a Mobile Switching Center (MSC), said system comprising:

means for receiving a request to activate said call forwarding feature towards said forward-to-number;

means, responsive to the received request, for requesting a speech connection with said forward-to-number to verbally verify said forward-to-number; and means, for detecting termination of said speech connection and response to a following subscriber indication to complete activation of said call forwarding feature, for transmitting a connection-less signal over a data channel to said MSC to activate said call forwarding feature towards sid forward-to-number.

18. The system of claim 17 wherein said means for transmitting further comprises means for transmitting a Direct Transfer Application Protocol (DTAP) based message encapsulating said forward-to-number.

19. The system claim 17 wherein said means for receiving said request further comprises means for receiving a user input indicating whether said outgoing call setup should be performed.

20. The system of claim 17 wherein said means for transmitting further comprises means for transmitting said connection-less signal after said outgoing call setup has been answered and disconnected.

\* \* \* \* \*